United States Patent
Fitz

(10) Patent No.: US 11,414,866 B2
(45) Date of Patent: Aug. 16, 2022

(54) TENSION MEMBER OR COMPRESSION MEMBER HAVING CORROSION-RESISTANT THREAD FLANKS

(71) Applicant: Pfeifer Holding GmbH & Co. KG, Memmingen (DE)

(72) Inventor: Christian Fitz, Bad Waldsee (DE)

(73) Assignee: Pfeifer Holding GmbH & Co. KG, Memmingen (DE)

( * ) Notice: Subject to any disclaimer, the term of this patent is extended or adjusted under 35 U.S.C. 154(b) by 23 days.

(21) Appl. No.: 16/639,421

(22) PCT Filed: Aug. 16, 2018

(86) PCT No.: PCT/EP2018/072268
§ 371 (c)(1),
(2) Date: Feb. 14, 2020

(87) PCT Pub. No.: WO2019/034750
PCT Pub. Date: Feb. 21, 2019

(65) Prior Publication Data
US 2021/0131103 A1    May 6, 2021

(30) Foreign Application Priority Data
Aug. 16, 2017 (DE) .......................... 202017104918.3

(51) Int. Cl.
*E04C 3/04* (2006.01)
*C23C 2/06* (2006.01)
*F16B 33/06* (2006.01)

(52) U.S. Cl.
CPC .................. *E04C 3/04* (2013.01); *C23C 2/06* (2013.01); *F16B 33/06* (2013.01); *E04C 2003/0447* (2013.01)

(58) Field of Classification Search
CPC . E04C 5/01; E04C 5/015; E04C 5/165; E04C 2003/0447; F16B 33/06; C23C 2/06
See application file for complete search history.

(56) References Cited

U.S. PATENT DOCUMENTS 5,746,555 A * 5/1998 McEvoy ................. E04C 5/165
403/307
10,077,567 B2   9/2018 Andree et al.
(Continued)

FOREIGN PATENT DOCUMENTS

CN         1324278 A    11/2001
CN       102212767 A    10/2011
(Continued)

OTHER PUBLICATIONS

Machine translation for JP_S61295363 from Japan Platform for Patent Information. May 2021.*
(Continued)

*Primary Examiner* — Christine T Cajilig
(74) *Attorney, Agent, or Firm* — Wolf, Greenfield & Sacks, P.C.

(57) ABSTRACT

The present application relates to a statically permanently loadable tension member or compression member (10) for a structure, which member comprises, on both end portions (12), thread flanks (14) of a thread for receiving a connection component. According to the invention, the thread flanks (14) are provided at least partially with a rolled zinc surface (16).

11 Claims, 1 Drawing Sheet

(56) References Cited

U.S. PATENT DOCUMENTS

| | | | | |
|---|---|---|---|---|
| 2004/0261244 A1* | 12/2004 | Colarusso | ............... | B21K 1/56 |
| | | | | 29/456 |
| 2005/0235594 A1* | 10/2005 | Hildreth | ................... | E04B 1/24 |
| | | | | 52/633 |
| 2006/0046080 A1* | 3/2006 | Keener | ................... | B05D 7/14 |
| | | | | 428/457 |
| 2014/0169911 A1* | 6/2014 | Sugimoto | .............. | C23C 4/131 |
| | | | | 411/366.1 |
| 2015/0037090 A1* | 2/2015 | Wakiyama | ............... | F16B 7/182 |
| | | | | 403/343 |
| 2016/0377107 A1 | 12/2016 | Bingeser et al. | | |
| 2017/0247884 A1* | 8/2017 | Houston | .................. | E04C 5/01 |
| 2018/0238050 A1* | 8/2018 | Harman | .................... | E04H 9/10 |
| 2019/0177976 A1* | 6/2019 | Wakiyama | ............... | E04C 5/03 |

FOREIGN PATENT DOCUMENTS

| | | | | | |
|---|---|---|---|---|---|
| DE | 36 39 532 | A1 | | 6/1988 | |
| DE | 3812720 | A1 * | 10/1989 | ............ | E04C 5/165 |
| DE | 90 12 577 | U1 | | 2/1991 | |
| DE | 691 25 289 | T2 | | 10/1997 | |
| DE | 297 11 950 | U1 | | 2/1998 | |
| DE | 10 2013 206 577 | A1 | | 10/2014 | |
| DE | 10 2014 216 790 | A1 | | 2/2016 | |
| EP | 0563490 | A1 * | 10/1993 | ............ | B21D 39/04 |
| EP | 3 109 340 | A2 | | 12/2016 | |
| FR | 2 151 513 | A5 | | 4/1973 | |
| GB | 566 533 | A | | 1/1945 | |
| GB | 770167 | A * | 3/1957 | ............... | E04B 1/19 |
| GB | 1 274 754 | A | | 5/1972 | |
| JP | S61-295363 | A | | 12/1986 | |
| JP | S62-60854 | A | | 3/1987 | |
| JP | S62-267040 | A | | 11/1987 | |
| JP | 2007-024107 | A | | 2/2007 | |
| JP | 6 217 416 | B2 | | 10/2017 | |
| WO | WO 92/10688 | A1 | | 6/1992 | |
| WO | WO 03/078852 | A1 | | 9/2003 | |
| WO | WO 2010/137984 | A1 | | 12/2010 | |

OTHER PUBLICATIONS

International Search Report and Written Opinion for International Application No. PCT/EP2018/072268, dated Nov. 22, 2018.
PCT/EP2018/072268, Nov. 22, 2018, International Search Report and Written Opinion.
PCT/EP2018/072268, Oct. 11, 2019, Ch. II International Preliminary Report on Patentability.

* cited by examiner

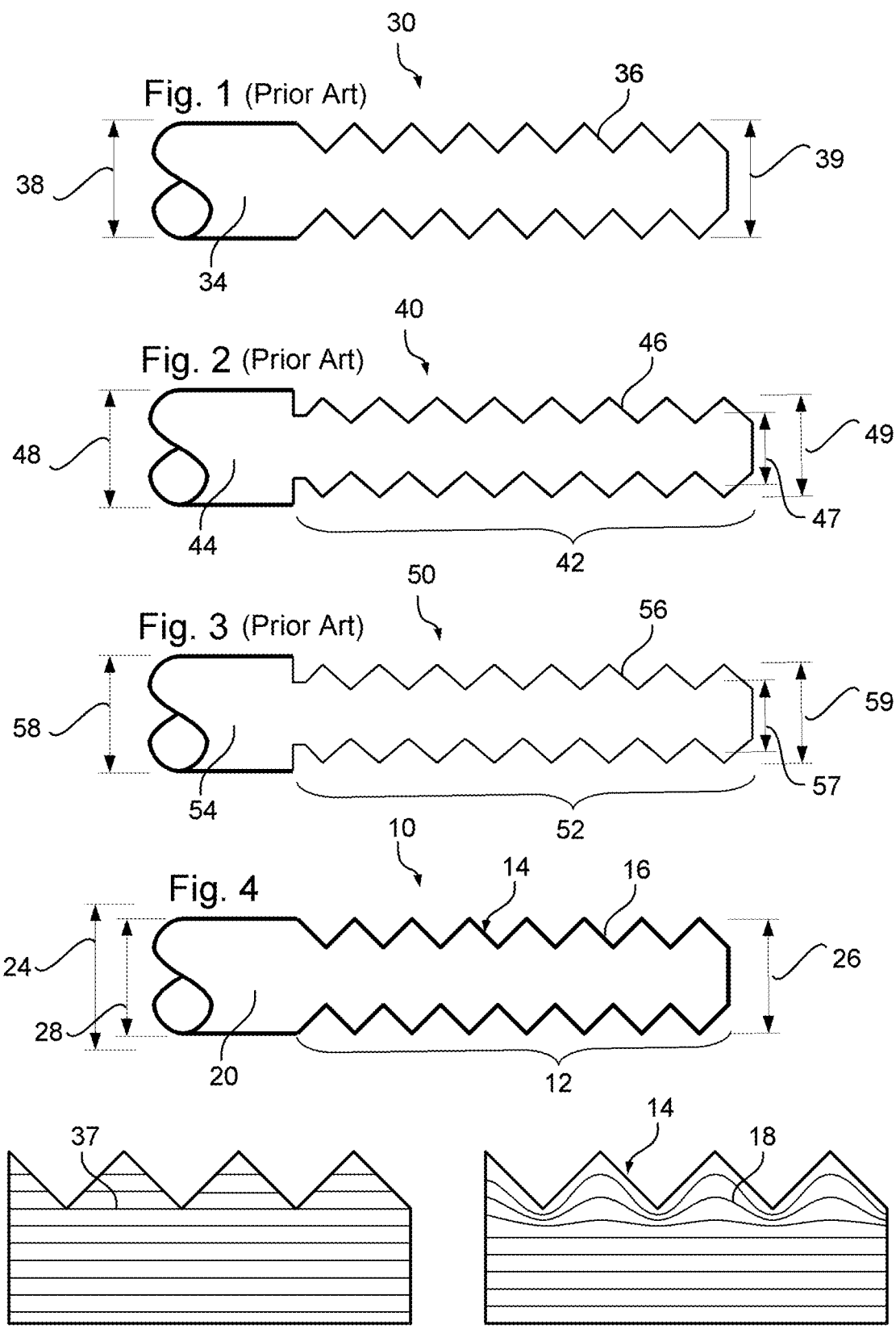

TENSION MEMBER OR COMPRESSION MEMBER HAVING CORROSION-RESISTANT THREAD FLANKS

CROSS-REFERENCE TO RELATED APPLICATIONS

This application is a national stage filing under 35 U.S.C. § 371 of international application no. PCT/EP2018/072268, filed Aug. 16, 2018, which claims priority to German application no. 20 2017 104 918.3, filed Aug. 16, 2017, each of which is herein incorporated by reference in its entirety.

TECHNICAL FIELD

The present invention relates to a statically permanently loadable tension member or compression member for a structure, which member is configured as a round material and comprises, on both end portions, thread flanks of a thread for receiving a connection component, as well as a method for producing such a member.

PRIOR ART

In existing tension members or compression members for structures with connection threads, it is, in principle, common practice to protect the thread flanks of the thread against corrosion. For this purpose, the thread is, for example, coated with zinc paint or organic corrosion protection, which has an insufficient protective effect, or is galvanised after the thread has been produced, which makes it necessary to rework the thread in order to restore the smooth running thereof. A further known method is based on galvanising the material of the member before the thread is incorporated; however, this leads to the destruction of corrosion protection in the region of the thread and makes subsequent coating with zinc paint or, for example, organic corrosion protection necessary if corrosion protection is desired.

All these methods known from the prior art, which will be explained in more detail below, have the disadvantage that the quality of the corrosion protection of the thread is unsatisfactory since the corrosion protection in the region of the thread must be at least partially removed again after its application or can only be inadequately applied so as not to impair the function of the thread.

Furthermore, the known methods for the production of a tension member or compression member provided with a corrosion-protected thread or of a similar component are not efficient since the process of applying corrosion protection interrupts the production steps to be carried out beforehand and afterwards, and since some reworking processes, such as thread cleaning, produce toxic vapours, the extraction of which requires additional equipment and expenditure. During thread cleaning, the zinc layer in the region of the thread is heated, which generates the toxic and environmentally harmful vapours that have to be extracted with great expenditure in terms of equipment.

The result of a first method known from the prior art is shown for one side of a tension member in FIG. 1. Shown in this figure is a tension member 30 having a non-threaded portion 34 and an end portion in which thread flanks 36 of a thread for receiving a connection component or other element are formed. The tension member 30 is produced by cutting a blank base material to length, cutting the thread, galvanising the thread and the non-threaded part and reworking the thread.

The initial diameter 38 and the thread diameter 39 are shown in FIG. 1, and it is apparent that the thread in the end portion was created by machining, namely by cutting the thread.

After galvanising, the required reworking is usually a recutting of the thread or cleaning of the thread to make it run smoothly again. During reworking, most of the protective layer applied in the region of the thread by galvanising is removed again such that considerably less zinc remains on the thread than on the rest of the member. Consequently, the corrosion protection of a tension member 30 produced in this manner is temporarily present in the region of the thread, but is, however, insufficient in the long term owing to the lower layer thickness.

FIG. 2 shows the result of a second production of a tension member with a thread and corrosion protection that is known from the prior art. In a first step, the tension member 40 is cut to length, then pre-trimmed in the thread region to a diameter between 47 and 49, the thread is then rolled to diameter 49, i.e. cold formed and thus machined without cutting, then galvanized and subsequently reworked to make it run smoothly again.

In many cases, pre-trimming in the thread region is a prerequisite for thread rolling in order to produce a high-quality thread. Very high degrees of accuracy are required here. When the thread rollers penetrate into the trimmed region 47, precisely that amount must be plastically pressed out to form the full thread flanks 46 to the outside 49. Only by means of trimming can the amount of material available for the thread be adjusted by adjusting the diameter of the member. In addition, possible inaccuracies and impurities on the surface of the round material are removed, which would otherwise be found in the sensitive thread surface.

FIG. 2 shows the tension member 40 with a non-threaded part 44 and an end portion 42 on which thread flanks 46 of a thread for receiving a connection component or other element are provided. FIG. 2 furthermore shows the initial diameter 48, the thread diameter 49 and the reduced diameter 47 of the component. Trimming is carried out to a diameter larger than 47 but smaller than 49.

The method, the result of which is illustrated in FIG. 2, also requires reworking of the thread and also results in this case in significantly less zinc remaining on the thread than on the rest of the member. In the method leading to FIG. 2, the thread is also recut or cleaned to make it run smoothly again.

One advantage of thread rolling as compared to thread cutting, which was used to produce the tension member 30 of FIG. 1, is basically that during cold forming, i.e. rolling, the fibre flow of the material is maintained, i.e. the individual fibres of the material are not severed, but merely re-formed. As is well known, this leads to a higher strength of the re-formed material and results in a member with a rolled thread having a significantly better dynamic load capacity in the region of its thread than a member with a cut thread. However, owing to the associated exposure to heat, subsequent galvanising of the rolled thread leads to the positive effect from the cold forming of the thread rolling, i.e. the better strength owing to the continuous fibre flow, being largely cancelled out again.

The method leading to the tension member 40 according to FIG. 2 is therefore also in need of improvement as regards the corrosion protection effect of the zinc, the strength of the thread with respect to dynamic loads and the production efficiency.

FIG. 3 shows the result of a third method known from the prior art for the production of a tension member 50. The tension member 50 in FIG. 3 was produced by galvanising the blank base material with diameter 58, then cutting the tension member to length, subsequently pre-trimming the thread region and then thread rolling to diameter 59 outside and 57 inside. Since, in the third method, galvanising occurs at the start and pre-trimming and re-forming only occur thereafter, the thread is formed completely without corrosion protection. FIG. 3 shows the tension member 50 with a non-threaded region 54 and an end portion 52 having thread flanks 56 of a thread for receiving a connection component without corrosion protection in the form of a zinc layer.

The initial diameter 58 of the round member, the thread outer diameter 59 and the reduced inner or core diameter 57 are also shown. In order to provide corrosion protection on the end portion 52 with the thread, organic corrosion protection, for example, must be subsequently applied. Alternatively, the thread can be coated with zinc paint or another corrosion protection, which, however, firstly means a considerable additional effort during production of the tension member and secondly results in insufficient corrosion resistance.

Known from DE 36 39 532 A1 is a method for the production of hot-dip galvanised parts with a thread. This document and the method and part disclosed therein do not relate to embodiments of a statically permanently loadable tension member or compression member for a structure within the meaning of the above technical field. Known from this document is a threaded spindle, such as is used, for example, as a head or base spindle for slab tables or load towers in scaffolding, and a construction support. These parts are characterised in that they consist of a hollow steel pipe and primarily support pressure loads from the own weight of the auxiliary constructions. These support pipes serve fundamentally very different purposes to statically permanently loadable tension members or compression members for a structure which have life expectancies of 50 years. Whereas pipes are supposed to be light so that the scaffolding constructed therefrom can be assembled, disassembled and transported quickly and easily, the focus in the case of statically permanently loadable tension members or compression members for a structure is primarily on the strength thereof over a long lifespan since assembly, disassembly and transport only have to take place once.

The pipes known from DE 36 39 532 A1 are used in scaffolding or formwork construction, where they are only subjected to pressure. They are therefore not static components used in a structure, but are rather auxiliary frames for the construction of a structure. They are not statically load-bearing parts or components of a structure.

A statically permanently loadable tension member or compression member within the meaning of the present technical field is part of a tension member system with large span widths for structures in the building industry, which is primarily designed for the transmission of tensile forces. In the present technical field, the focus therefore lies on a tension member or a compression member in a system of statically loadable components in a structure with a life expectancy of up to fifty years with corrosion and fatigue loads.

DESCRIPTION OF THE INVENTION

Against this background, one object of the present invention is to provide a statically permanently loadable tension member or compression member for a structure, which member has improved corrosion protection and is less sensitive to dynamic loads (fatigue). A further object of the invention is to provide a production method for a statically permanently loadable tension member or compression member for a structure, by means of which a tension member or compression member can be produced which has better corrosion protection than the prior art and is less sensitive to fatiguing dynamic alternating loads, and which can be carried out more efficiently and in a more environmentally friendly manner than the production methods known from the prior art.

The above object is solved by a statically permanently loadable tension member or compression member for a structure, which member is designed as a robust, particularly strong round material and comprises, on both end portions, thread flanks of a thread for receiving a connection component. According to the invention, the thread flanks are provided at least partially with a rolled zinc surface.

A "rolled zinc surface" is to be understood as a zinc surface that was rolled, namely cold formed, i.e. processed without cutting, to form the thread flanks. The fibres in FIG. 6 are aligned with the load and are not severed as is the case in the cut thread in FIG. 5. This increases the dynamic load capacity (fatigue resistance). Furthermore, the region of the thread flanks is completely surrounded by the zinc layer, which is beneficial to the durability against corrosion. A rolled zinc surface thus differs from a cut zinc surface in which a cut was made in a zinc surface as well as from a zinc surface that was subsequently applied to a rolled thread. Although the region is then zinc protected, the load-bearing fibres underneath are severed, which leads to poorer performance in respect of dynamic loads. In particular a thread made of a galvanised raw material, which is pre-trimmed and rolled in the region of the thread and which was hot-dip galvanised after cold forming, does not have a "rolled zinc surface" owing to the different fibre flows in the zinc layer.

Significantly improved corrosion protection can be achieved by the rolled zinc surface, i.e. an already existing zinc surface which was subsequently processed by rolling (cold forming), since the surface does not have to be reworked after rolling, i.e. after the thread has been formed. The reason for this is that the form impressed upon the thread by rolling is the desired form of the thread within the end tolerance without reworking such as cleaning and thus subsequent damage. In the methods known from the prior art, in particular the reworking required when applying a subsequent zinc coating leads to a significant reduction in the corrosion protection effect of the zinc in the region of the thread. Furthermore, cold forming of the zinc layer allows the positive effects of cold forming in respect of fatigue load to be maintained. Unlike in the previously known methods, these positive effects are not reversed or partially cancelled out by a subsequent input of heat (hot-dip galvanizing), but are rather fully exploited.

The statically permanently loadable tension member or compression member for a structure as according to the invention can be produced according to the following method.

A method according to the invention for the production of a statically permanently loadable tension member or compression member for a structure comprises providing a round material, applying a zinc layer to produce a zinc surface, and non-cutting re-forming, preferably by rolling, of at least one end portion to produce thread flanks of a thread for receiving a connection component.

This method considerably improves production as compared to the methods known from the prior art since the production process can be organised such that it is more streamlined and more efficient. This is due in particular to the fact that the members can be produced in a single operation and the production process does not have to be interrupted by galvanising, thread cutting and/or thread cleaning. In addition, since thread reworking and in particular thread cleaning are no longer carried out, there is no longer any need to extract the resulting toxic fumes during production.

For these reasons, the method according to the invention is particularly efficient.

The non-cutting re-forming of at least one end portion so as to produce thread flanks of a thread for receiving a connection component is preferably carried out by one or more rotating tools, so-called thread rolling, while the tension member or compression member, i.e. the workpiece, does not rotate. Given the large dimensions of a statically permanently loadable tension member or compression member for a structure within the meaning of the present technical field, it is particularly advantageous to have a tool head roll about the part which is stationary or only advanced in a linear manner in order to re-form the end portion or portions.

Alternatively, the part can also be rotated in a stationary tool, but this is disadvantageous owing to the length of the tension member or compression member since this approach leads to problems with the precise support of the rod and the avoidance of unbalance.

The tension member or compression member is configured as a round material. This means that the tension member or compression member has a round cross-section and is configured such that it is solid, i.e. not as a hollow pipe. Alternatively, however, it is also possible for the tension member or compression member to have a cross-section other than a round cross-section. The tension member or compression member is preferably made of steel, preferably high-strength or higher-strength steel, more preferred of fine-grained steel.

Configuring the tension member or compression member as a higher-strength, fine-grained steel round material has advantages in terms of its production, strength and the formation of the thread flanks of the thread.

In a preferred embodiment, the zinc surface is rolled in a manner that does not involve removal. This means that the zinc surface is not removed during re-forming, for example re-forming of the round material into the thread, but is rather re-formed as a whole without cutting. This advantageous feature furthermore means that the zinc surface was also not removed after rolling, for example by thread cutting or thread cleaning. The zinc particles are rather incorporated into the surface of the thread flanks and remain there permanently without flaking off during screwing.

The tension member or compression member comprises on both end portions thread flanks of a thread for receiving a connection component. This allows the tension member or compression member to be easily connected at both ends with a corresponding connection component.

The tension member or compression member preferably has a continuous fibre flow in the base material in the end portion or portions and preferably also between its two end portions. A continuous fibre flow, such as usually results during cold forming, i.e. rolling of the thread, leads to increased resistance to dynamic loads and therefore fatigues less quickly. This feature is also an indication that no significant heat treatment of the end portion and preferably also of the region between the two end portions has taken place after cold forming, i.e. after thread rolling.

A statically permanently loadable tension member or compression member for a structure, as according to the invention, can be produced by providing a round material, applying a zinc layer to produce a zinc surface, and non-cutting re-forming of at least one end portion to produce thread flanks of a thread for receiving a connection component. Such a tension member or compression member solves the above object and, in particular, also enables production by means of a particularly efficient method.

The round material can either be provided in the already desired diameter or it can be pre-trimmed over its entire length, but at least over the end portion where the thread flanks of the thread are to be produced, such that after the subsequent application of the zinc layer, the diameter, taking into account the specified tolerances, allows the production of a dimensionally accurate thread on the rolling machine and the surface quality of the round material is particularly high.

In this approach it is not the zinc layer which is removed, but rather the round material prior to application of the zinc layer, and the zinc layer is re-formed together with the material of the member. In this manner, a thread can be produced which, unlike in the prior art, does not need to be reworked in the thread region. At the same time, a very reliable corrosion protection is formed in the region of the thread and the strength of the thread with respect to fatigue and dynamic loads is particularly high owing to the re-forming.

In a particularly preferred embodiment, the tension member or compression member can be produced by the non-cutting re-forming of both end portions to produce thread flanks of in each case one thread for receiving a connection component.

Such a preferred method includes a non-cutting re-forming of both end portions to produce thread flanks of in each case one thread for receiving a connection component.

This allows the tension member or compression member to be connected at both ends with a connection component, and the thread used herefor meets the high quality requirements in respect of corrosion protection, strength and production efficiency. Alternatively, only one end portion can be produced in this manner.

In a further preferred embodiment, the tension member or compression member can be produced without galvanising, in particular without hot-dip galvanising, after re-forming to produce the thread flanks.

The corresponding production method of the tension member or compression member of this preferred embodiment thus provides that no galvanising step, in particular no hot-dip galvanising step, is carried out on the tension member or compression member after re-forming to produce the thread flanks.

In this manner, thread reworking, during which the zinc layer would be at least partially removed again, can be avoided. Furthermore, the continuous fibre flow in the region of the end portion and thus of the thread flanks and the strength effect achieved by non-cutting re-forming can be maintained in this manner.

The zinc surface of the tension member or compression member is preferably hot-dip galvanised.

The step of applying a zinc layer therefore preferably includes a step of hot-dip galvanising the surface of the round material in order to provide the zinc surface in this manner before it is re-formed without cutting, i.e. rolled.

In a preferred embodiment, the thread flanks are raised at least in sections with respect to a non-threaded part of the tension member or compression member. This embodiment differs in particular from embodiments that were produced by pre-trimming only the thread region, not the non-threaded part, and thus selectively reducing the diameter of the member in the end portion before applying the thread.

The diameter of the thread is therefore larger than the diameter of the tension member or compression member in the non-threaded region.

This preferred embodiment can be produced in particular in that the round material is initially pre-trimmed or drawn to size over its entire length, or already has a diameter suitable for this purpose as a result of other methods, such that the diameter after application of the zinc layer allows the production of a dimensionally accurate thread on the rolling machine.

In a preferred embodiment of the tension member or compression member, the surface of the tension member or compression member is completely provided with zinc before producing the thread by rolling or is completely provided with zinc with the exception of its end face.

This preferred embodiment can be achieved in particular by first of all galvanising the round material or other starting material of the tension member or compression member before it is re-formed without cutting to form the thread flanks in the end portion. If necessary, the starting material, for example a blank round material, is cut to length after galvanising and before thread rolling, i.e. its length is adjusted by cutting. When cutting to length, i.e. when cutting a certain length of the galvanised and, if necessary, pre-trimmed base material, a non-galvanised end face is created which can be subsequently provided with corrosion protection if required, but does not necessarily have to have this protection. Since the end face is oriented towards the side of the threaded end of the tension member facing away from the load, a slight corrosion attack at a later stage does not play a major role there with respect to static loadability. Zinc protection against corrosion must therefore be provided within the thread length and also on the tension member itself.

The zinc surface or the zinc of the tension member or compression member is in particular configured as surface protection, preferably against corrosion. In other words, the zinc surface or zinc is configured so as to provide effective protection of the surface, in particular against corrosion. This requires in particular a continuous and complete coating of the part of the surface to be protected in a sufficient thickness, which is not fulfilled in the prior art in the region of the thread.

The tension member or compression member of the present application can in particular be used in a system such as described in the utility model application DE 20 2017 104 917.5 and the international patent application PCT/EP2018/071757 of the present applicant, which was filed under the title "System consisting of statically loadable components in a structure". The relevant content of the utility model application DE 20 2017 104 917.5 and the international patent application PCT/EP2018/071757 is hereby expressly also made subject matter of the present application.

The invention thus also relates to a system consisting of at least two tension members or compression members as described above, wherein the threads of at least one end portion of the at least two tension members or compression members have the same thread load capacity and determine a respective threshold tensile force of the at least two tension members or compression members.

Since the thread flanks are provided at least partially with a rolled zinc surface, the threads can be configured particularly reliably so that it is possible to dimension the thread load capacity of the tension members or compression members equally in a particularly efficient and at the same time precise manner.

Further features and advantages of the invention are apparent from the claims as a whole and the following description of the figures.

BRIEF DESCRIPTION OF THE FIGURES

FIG. 1 shows a tension member from the prior art according to a first known production method.

FIG. 2 shows a tension member from the prior art according to a second known production method.

FIG. 3 shows a tension member from the prior art according to a third known production method. The zinc layer is removed in the thread region.

FIG. 4 shows a tension member according to a preferred embodiment, which is trimmed to a desired diameter having diameter 28. The rolled thread is shown in the end region 12. The thread flanks 14 have the outer diameter 26, which is larger than the trim diameter 28. The thread flanks have a continuous, dimensionally accurate zinc layer 16 that is intensively bonded to the steel or even incorporated into the steel.

FIG. 5 shows a schematic sectional view of a severed fibre flow in the case of a cut thread.

FIG. 6 shows a schematic sectional view of a continuous fibre flow in the case of a rolled thread with a preferably continuous zinc layer on the fibre flow.

MANNERS OF IMPLEMENTING THE INVENTION

FIG. 4 shows a preferred embodiment of a tension member 10 for a structure, which member comprises, on at least one end portion 12, thread flanks 14 of a thread for receiving a connection component. The thread flanks 14 are completely provided with a rolled zinc surface 16.

As is illustrated in the comparison of FIGS. 5 and 6, cut threads, i.e. threads produced by machining, differ from rolled threads, i.e. threads produced by non-cutting machining, i.e. cold forming. FIG. 6 shows a continuous fibre flow 18 in the material from which the thread flanks 14 were produced. This continuous fibre flow 18 means that the fibres of the material were not interrupted by the forming of the thread flanks 14, but were rather re-formed. In contrast, an interrupted fibre flow 37 can be seen in a cut thread. Thread cutting creates the form of the thread simply by removing material by cutting, thus interrupting the individual fibres of the base material. This reduces the strength of the base material as compared to the continuous fibre flow 18 of FIG. 6. During rolling, the thread roller penetrates into the steel surface, thereby displacing material which then pushes up next to the groove and forms the outer thread flank, provided that the trim diameter and the tool are precisely matched to one another. For this reason in particular, a rolled thread is more resistant to dynamic loads and thus fatigues less quickly.

Shown adjacent to the end portion 12 in FIG. 4 is a non-threaded part 20 of the tension member 10, which transitions in a continuous manner into the thread flanks 14 in the end portion 12. In other words, there is no abrupt narrowing in diameter from the non-threaded part 20 to the end portion 12, such as is illustrated in particular in FIGS. 2 and 3, wherein the thread region was trimmed before thread rolling to allow for a dimensionally accurate thread.

The embodiment of the tension member 10 shown in FIG. 4 was prepared by pre-trimming the original round material over its entire length such that after application of the zinc layer to produce the zinc surface 16, the diameter allows the production of the dimensionally accurate thread on the rolling machine, taking into account the specified tolerances. The zinc layer forming the zinc surface 16 is thereby not removed, but is applied after the optional pre-trimming and then re-formed together with the material of the member.

For this reason, the starting diameter 24 was reduced also in the non-threaded part 20 to the pre-trimmed, reduced diameter 28 that was used to produce the thread with the thread diameter 26. However, it is fundamentally also possible for the tension member 10 to not be pre-trimmed over its entire length, but rather only in the region of the thread, provided that the zinc layer is applied only after pre-trimming and prior to re-forming. The diameter 26 is always larger than the trim diameter 28.

The end face 22 of the tension member 10 in the embodiment shown in FIG. 4 is preferably provided with an organic or other corrosion protection, but can, however, also be configured without corrosion protection.

The preferred embodiment described above provides a tension member or compression member for a structure, which member has improved corrosion protection as compared to the prior art as well as improved strength with respect to fatigue and dynamic loads and can be produced more efficiently.

The invention claimed is:

1. A statically permanently loadable tension member for a structure, the tension member comprising:
   a tension member body including end portions and thread flanks of a thread provided on each end portion and configured to receive a connection component,
   the tension member body configured as a solid round material of higher-strength steel,
   the thread flanks being raised at least in sections with respect to a non-threaded part of the tension member body having a round cross-section, the thread flanks being provided at least partially with a rolled zinc surface configured as corrosion protection.

2. The tension member according to claim 1, wherein the zinc surface is rolled in a manner that does not involve removal of the zinc surface.

3. The tension member according to claim 1, wherein the tension member body has a continuous fibre flow in the base material in the end portion.

4. A method of producing a statically permanently loadable tension member for a structure, the tension including thread flanks of a thread on both end portions thereof, the thread flanks configured to receive a connection component,
   wherein the tension member is configured as a solid round material of higher-strength steel,
   wherein the thread flanks are raised at least in sections with respect to a non-threaded part of the tension member and are provided at least partially with a rolled zinc surface configured as corrosion protection, according to one of the preceding claims,
   the method acts of:
   providing the round material with a desired diameter or just below the desired diameter for later rolling, then applying a zinc layer to produce the zinc surface, and then non-cutting re-forming the two end portions to produce the thread flanks,
   wherein the re-forming is carried out by one or more rotating tools, while the tension member does not rotate.

5. The method according to claim 4, wherein an act of galvanising, in particular hot-dip galvanising, is not performed after the act of re-forming to produce the thread flanks.

6. A tension member for a structure, wherein the tension member is produced by a method according to claim 4.

7. The tension member according to claim 1, wherein the zinc surface is hot-dip galvanised.

8. The tension member according to claim 1, wherein the surface of the tension member body is completely provided with zinc.

9. A system comprising at least two tension members according to claim 1, wherein the threads of at least one end portion of the at least two tension members have the same thread load capacity and determine a respective threshold tensile force of the at least two tension members.

10. The tension member according to claim 3, wherein the tension member body has a continuous fibre flow in the base material between the end portions.

11. The tension member according to claim 1, wherein the surface of the tension member body is completely provided with zinc with the exception of its end faces.

* * * * *